United States Patent
Kale et al.

(10) Patent No.: US 11,175,856 B2
(45) Date of Patent: Nov. 16, 2021

(54) BACKGROUND OPERATION SELECTION BASED ON HOST IDLE TIME

(71) Applicant: Micron Technology, Inc., Boise, ID (US)

(72) Inventors: Poorna Kale, Folsom, CA (US); Ashok Sahoo, San Jose, CA (US)

(73) Assignee: Micron Technology, Inc., Boise, ID (US)

(*) Notice: Subject to any disclaimer, the term of this patent is extended or adjusted under 35 U.S.C. 154(b) by 95 days.

(21) Appl. No.: 16/678,850

(22) Filed: Nov. 8, 2019

(65) Prior Publication Data

US 2021/0141561 A1    May 13, 2021

(51) Int. Cl.
*G06F 3/06* (2006.01)

(52) U.S. Cl.
CPC .......... *G06F 3/0659* (2013.01); *G06F 3/0604* (2013.01); *G06F 3/0656* (2013.01); *G06F 3/0673* (2013.01)

(58) Field of Classification Search
CPC .................................................... G06F 3/0659
See application file for complete search history.

(56) References Cited

U.S. PATENT DOCUMENTS

| | | | | |
|---|---|---|---|---|
| 2007/0157046 A1* | 7/2007 | Samson | ............ | G11C 11/40615 713/323 |
| 2009/0319720 A1* | 12/2009 | Stefanus | ............ | G06F 12/0246 711/103 |
| 2017/0329710 A1* | 11/2017 | Krause | ............... | G06F 13/1673 |
| 2018/0276116 A1* | 9/2018 | Hahn | .................... | G06F 3/0659 |
| 2019/0286219 A1* | 9/2019 | Anazawa | .................. | G06F 1/28 |
| 2019/0317901 A1* | 10/2019 | Kachare | ............. | G06F 12/0246 |

* cited by examiner

*Primary Examiner* — David E Martinez
(74) *Attorney, Agent, or Firm* — Lowenstein Sandler LLP

(57) ABSTRACT

An indication can be received that a host system is to become idle for a period of time. A background operation can be selected from multiple background operations based on the period of time that the host system is to become idle. The selected background operation can be executed during the period of time that the host system is to become idle.

20 Claims, 6 Drawing Sheets

200

Receive an indication, from a host system, that the host system is to become idle for a period of time
210

Determine to execute a background operation from a set of background operations based on the period of time that the host system is to be idle
220

Execute the background operation from the set of background operations during the period of time the host system is idle
230

| Operation | Description | Approximate Time of Execution |
|---|---|---|
| L2P Table Updates | Transfering data from SRAM to NAND | < 10ms |
| ECC Scan | Scan critical blocks for blocks that could fail due to ECC errors | 10ms – 100ms |
| Erase | Erase blocks identified as "discarded" to be brought into wear leveling pool | 100ms – 1000ms |
| Read-Modify-Write | Read blocks identified by wear leveling, then modify and write the blocks | 1000ms – 10,000ms |
| Refresh | Refresh blocks identified as at risk to lose data | 10,000ms – 100,000ms |

FIG. 5

BACKGROUND OPERATION SELECTION BASED ON HOST IDLE TIME

TECHNICAL FIELD

Embodiments of the disclosure relate generally to memory sub-systems, and more specifically, relate to memory sub-system background operation selection based on host idle time.

BACKGROUND

A memory sub-system can be a storage device, a memory module, and a hybrid of a storage device and memory module. The memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 5 is a table illustrating multiple background operations that can be selected in view of the idle time of the host system and operation execution time, in accordance with some embodiments of the present disclosure.

DETAILED DESCRIPTION

Figure 1:
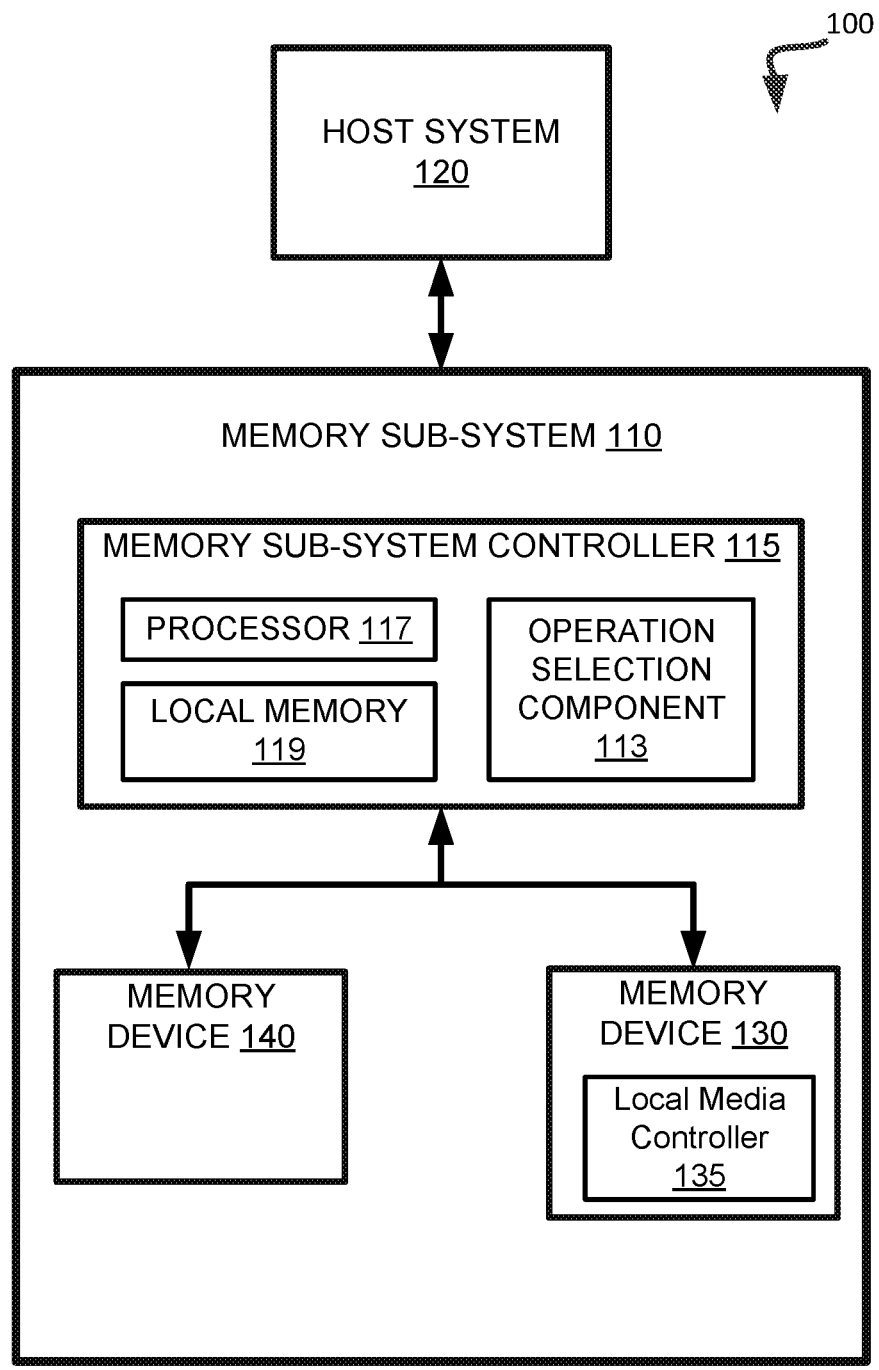
FIG. 1 illustrates an example computing environment that includes a memory sub-system in accordance with some embodiments of the present disclosure.

Aspects of the present disclosure are directed to background operation selection based on host idle time. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components (also hereinafter referred to as "memory devices"). The host system can provide data to be stored at the memory sub-system and can request data to be retrieved from the memory sub-system.

In some applications of memory sub-systems, such as video surveillance, every video frame captured can be important and therefore needs to be stored at the memory sub-system. A frame drop-less system is a system that can store each video frame without losing any of the video frames captured by a recording device. Conventional memory sub-systems use a series of data bursts each followed by an idle period during which background operations, such as garbage collection and wear leveling, can occur. A burst can be a series of write operations from the host system to the memory sub-system that is followed by a period of no write operations being transmitted from the host system. However, the duration of the idle periods of the host system during which background operations are executed at the memory sub-system is generally unknown to the memory sub-system.

Conventional memory sub-systems include static parameters to select the background operations executed during idle periods. For example, the background operations that are run during idle times can be executed in a predetermined order according to the static parameters. However, host systems can become idle for many different periods of time. A host system that is continuously operating and recording data can become idle for short periods of time in between data bursts sent to the memory-subsystem. On the other hand, a host system can become idle for longer periods of time, such as if the host system is shut off, if the host system enters a maintenance mode, etc. During longer idle periods a significant amount of background work (i.e., garbage collection) could be completed. Background work can include any number of media maintenance operations to provide proper performance and reduce latency. For example, the operations can include clearing invalid data (e.g., garbage collection), refreshing data blocks, providing wear leveling, etc. However, with static parameters the amount of background work performed is limited because different background operations perform different amounts of background work and take different amounts of time to execute. Therefore, if the background operations executed are not selected according to the idle period, then some background work might not be performed although it could have been performed during the idle period.

Aspects of the present disclosure address the above and other deficiencies by having a memory sub-system that can select background operations based on idle time of a host system. The host system can indicate to the memory sub-system that the host system will be idle for a period of time. The background operations that are executed during that period of time can then be optimized based on the idle time indicated by the host system. For example, the type or types of background operations (i.e., wear leveling, garbage collection operations, etc.) to be performed during idle can be selected based on the indicated idle time.

Advantages of the present disclosure include, but are not limited to, increased background operation performance and thus increased over-provisioning and lower write-amplification. Aspects of the present disclosure will also increase the performance (i.e., reduced latency) of the memory sub-system and reduce the number of dropped frames.

FIG. 1 illustrates an example computing environment 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, or such computing device that includes a memory and a processing device. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

An example of non-volatile memory devices (e.g., memory device 130) includes a negative- and (NAND) type flash memory. Each of the memory devices 130 can include one or more arrays of memory cells such as single level cells (SLCs) or multi-level cells (MLCs) (e.g., triple level cells (TLCs) or quad-level cells (QLCs)). In some embodiments, a particular memory component can include an SLC portion, and an MLC portion, a TLC portion, or a QLC portion of memory cells. Each of the memory cells can store one or more bits of data used by the host system 120. Furthermore, the memory cells of the memory devices 130 can be grouped as memory pages or memory blocks that can refer to a unit of the memory component used to store data.

Although non-volatile memory components such as NAND type flash memory are described, the memory device 130 can be based on any other type of non-volatile memory, such as read-only memory (ROM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130.

The memory sub-system 110 includes an operation selection component 113 that can adjust background operation parameters based on an idle time of the host system 120. In some embodiments, the memory sub-system controller 115 includes at least a portion of the operation selection component 113. For example, the memory sub-system controller 115 can include a processor 117 (processing device) configured to execute instructions stored in local memory 119 for performing the operations described herein. In some embodiments, the operation selection component 113 is part of the host system 120, an application, or an operating system.

The operation selection component 113 can receive an indication that the host system 120 is going to become idle and therefore the memory sub-system 110 will not receive any data, or will receive data at a lower rate, while the host system 120 is idle. The operation selection component 113 can then determine one or more parameters, such as which background operations the memory sub-system controller 115 is to execute while the host system 120 is idle. Further details with regards to the operations of the operation selection component 113 are described below.

Figure 2:
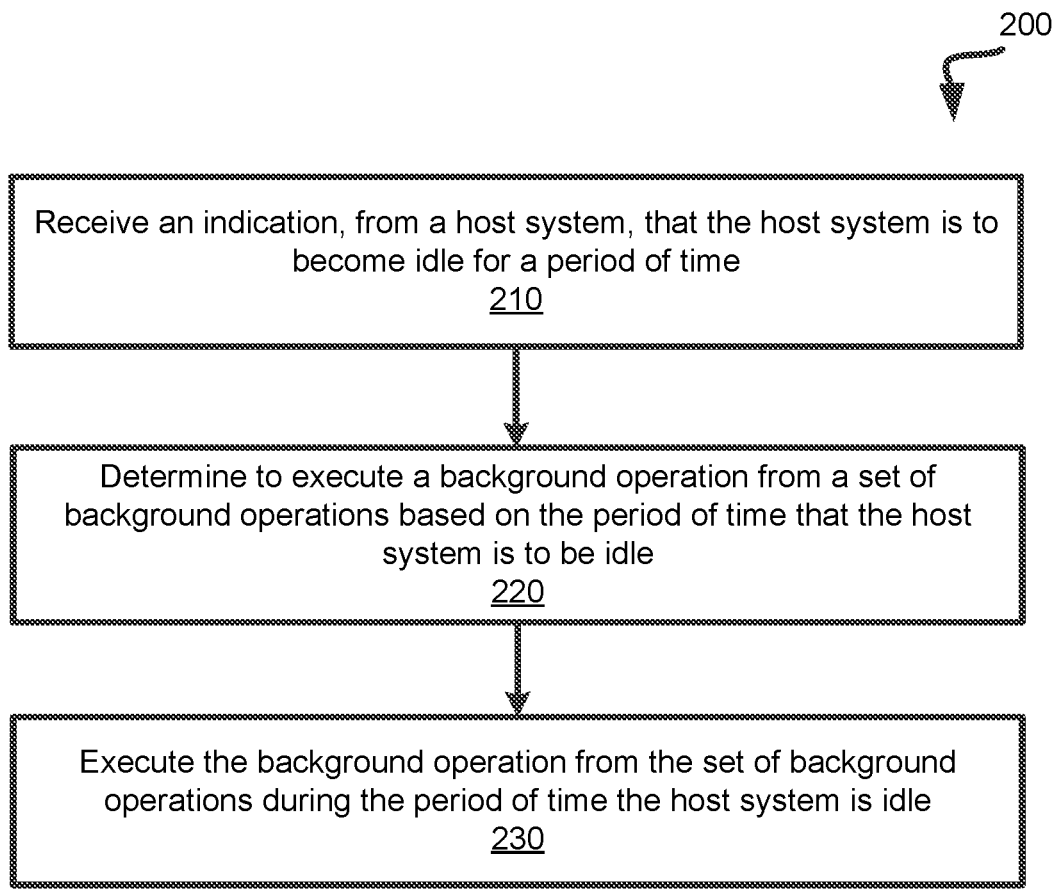
FIG. 2 is a flow diagram of an example method to select background operations based on host idle time, in accordance with some embodiments of the present disclosure.

FIG. 2 is a flow diagram of an example method 200 to select background operations based on host idle time, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the operation selection component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing device receives an indication, from a host system, that the host system is to become idle for a period of time. The host system can become idle at specific moments during operation (e.g., after a data burst) and can identify when usage events of the host system indicate that the host system will become idle. For example, the host system can indicate to the processing device that the host system will be idle before the host system powers off, after a user pauses operation, or in response to any other usage event. Additionally, the host system can periodically become idle for a period of time to allow for the memory sub-system to execute background and other maintenance operations. For example, a host system can become idle each day (or any other designated interval) for a period of time that allows for the processing device of the memory sub-system to complete background operations. The host system can transmit an indication that the host system will become idle for the identified period of time (e.g., either the time identified based on usage events or the idle period occurring periodically, or both). While the host system is idle, the host system can transmit data at a slower bit rate than when the host system is otherwise not idle, or not transmit any data at all to the memory sub-system.

At operation 220, the processing device determines a background operation from a set of background operations based on the period of time that the host system is to be idle. Different background operations can take different amounts of time to complete and can utilize different resources as well as different amounts of resources. For example, an operation to update a logical to physical (L2P) address table can take less than ten milliseconds to complete while a refresh operation can take upwards of ten seconds to complete. Thus, the processing device can select one or more background operations based on the amount of time that the host system is to be idle. The background operations can include wear-leveling, refresh, defragmentation, garbage collection, or any other background/maintenance operation of a memory sub-system. Additionally, processing device can select the background operations based on the current state and usage of the memory sub-system. The state and usage of the memory sub-system can include the number of available buffer blocks of the memory sub-system, the total amount of memory available in the memory sub-system, the volatility of the data stored at the memory sub-system, and so forth. Buffer blocks can be a set of blocks of the memory sub-system that are designated to temporarily store data when it is received from the host system. The data can then be transferred from the buffer blocks to other blocks of the memory sub-system where the data can be stored for a longer period of time. In one example, the processing device can select background operations to ensure that at least a threshold number of buffer blocks of the memory sub-system are available to receive new data. The total amount of memory available can indicate that garbage collection should be prioritized to clear up additional memory in the memory sub-system. In addition, the volatility of data can indicate that a refresh operation or the like should be prioritized so that stored data is not lost. Finally, at operation 230, the processing device executes the background operation, or operations, selected from the set of background operations during the period of time while the host system is idle.

Figure 3:
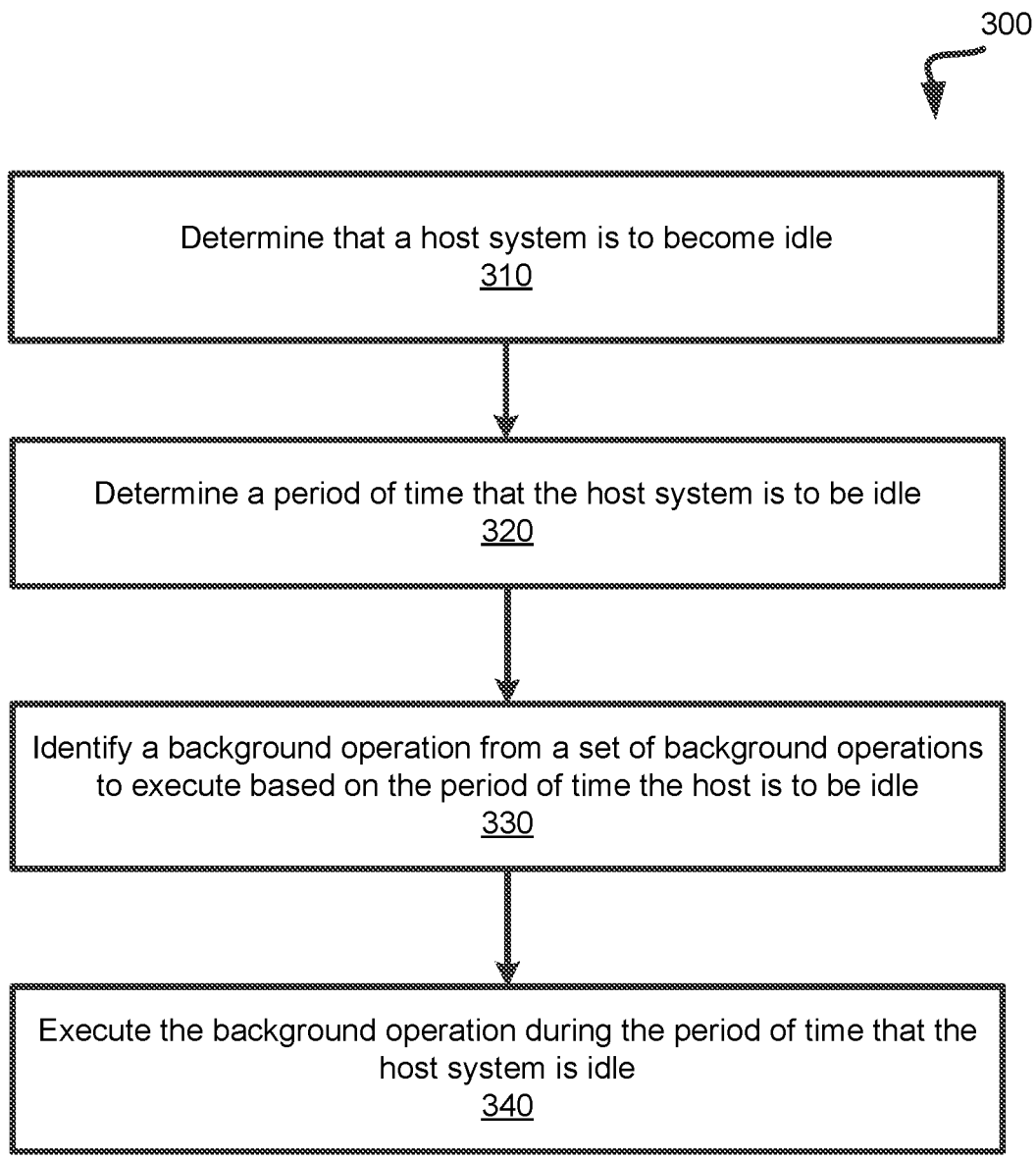
FIG. 3 is a flow diagram of another example method to select background operations based on host idle time in accordance with some embodiments of the present disclosure.

FIG. 3 is a flow diagram of an example method 300 to select background operations based on host system idle time, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the operation selection component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing device determines that a host system is to become idle. The processing device can receive an indication from the host system that the host system is to become idle. For example, the host system can be a surveillance video system, and the surveillance video system does not transmit any data to the processing device (i.e., is idle) when there is no motion recorded. Thus, the surveillance video system can indicate that it will be idle when no motion has been detected for some period of time. Alternatively, the processing device can determine that the host system is to be idle based on previous patterns of data received from the host system. For example, the host system can be a video system that is activated during certain parts of the day. Thus, the processing device can determine that based on previous patterns of the time of day that data is received, or not received, the host system is to be idle for some period of time. In another example, the host system can become idle to provide the memory sub-system time to perform background and other maintenance operations. In some instances, the host system can guarantee that it will be idle for some minimum period of time. For example, the host system can shut down operation and indicate to the memory sub-system that data (e.g., video) will not be transmitted to be stored for the minimum period of time. In this way, the host system can provide the memory sub-system with idle time to perform background operations and to ensure that a threshold number of buffer blocks and over-provisioned blocks are available to receive new data. Thus, the idle time can help ensure that data frames are not dropped.

At operation 320, the processing device determines a period of time that the host system is to be idle. The host system can provide an indication to the processing device of the period of time that the host system is to be idle. The host system can become idle in response to an operation that is executed (e.g., data is sent) or in response to a usage event that occurs (e.g., no motion detected by camera). The host system can then select and forward, to the processing device, a duration of the expected idle time based on the operation or usage of the host system. In another example, the processing device determines the period of time that the host system is to be idle based on previous usage data received from the host system. For example, the processing device can identify patterns or indicators that can be used to calculate the period of time the host system will be idle.

At operation 330, the processing device identifies a background operation from a set of background operations to execute based on the period of time the host is to be idle. The processing device can execute background operations during host system idle periods. However, different background operations can have different execution times. Therefore, a background operation can be selected to be executed based on the duration of the period of time the host system is to be idle. For example, the background operation can be selected because the execution time of the background operation closely matches the idle period, or is less than the idle period. In this way, the processing device can maximize the use of the idle period to manage the memory sub-system, as described in more detail with respect to FIG. 5. Additionally, the background operations can be identified based on the current state and usage of the memory system. The state and usage of the memory sub-system can include the number of available buffer blocks of the memory system, the total amount of memory available in the memory system, the volatility of the data stored at the memory system, and so forth.

At operation 340, the processing device executes the background operation during the period of time while the host system is idle. The processing device can execute a single background operation or multiple background operations while the host system is idle. For example, during relatively long periods of idle time the processing device can execute a large number of background operations that can take a long time. If the idle period duration is short then the background operation selected and executed by the processing device can be an operation that takes a short amount of time. In addition, if the processing device completed a background operation and time still remains in the idle period then the processing device can select and execute one or more additional background operations depending on the amount of time remaining in the idle period.

Figure 4:
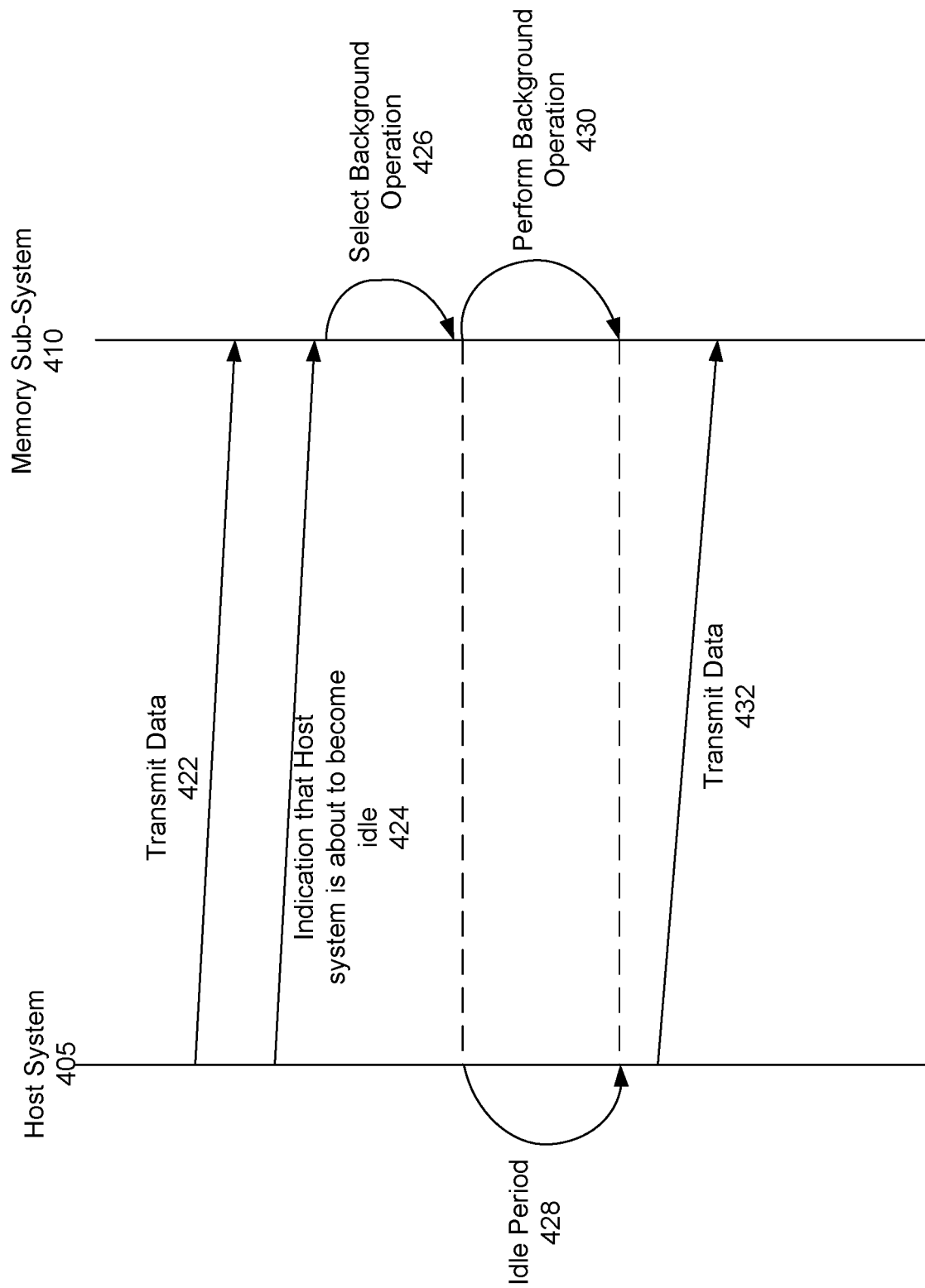
FIG. 4 illustrates an example of determining a background operation to execute based on an idle time indication from a host system, in accordance with some embodiments of the present disclosure.

FIG. 4 illustrates a process for selecting a background operation, by a memory sub-system 410, to execute based on an indication that a host system 405 will become idle. Initially, the host system 405 can transmit data 422 to the memory sub-system 410. The data can be transmitted via a continuous serial bit stream and/or in bursts of data comprising a bundle of data transmitted over a defined period of time. The bursts of data can be followed by an idle period during which the host system temporarily does not transmit data, allowing the memory sub-system 410 to perform garbage collection and other operations. When the host system 405 is about to become idle for a period of time it can transmit an indication that the host system is about to become idle 424 to the memory sub-system 410.

Upon receiving the indication 424 that that host system 405 is about to become idle, the memory sub-system 410 can determine an amount of time that the host system 405 is going to be idle. The memory sub-system 410 can determine the amount of time the host system 405 will be idle based on a duration of the idle time included in the indication 424. For example, the indication can include the amount of time the host system 405 will be idle. Based on the determined idle time, the memory sub-system 410 can select a background operation 426 to be performed while the host system 405 is idle. Different background operations can take different amounts of time, and/or clock cycles to execute. Therefore, the memory sub-system 410 can select the background operations to maximize the amount of background work completed while the host system 405 is idle.

After selecting the background operation 426, the memory sub-system 410 can then perform the selected background operation 430 during the idle period 428 during which the host system 405 does not transmit data to the memory sub-system. Alternatively, during the idle period 428, the host system 405 simply transfers data at a lower bit rate rather than completely ceasing transfer of data. Finally, after the idle period 428 is complete the host system 405 returns to transmitting data 432 at its normal rate.

FIG. 5 illustrates different background operations that the memory sub-system can select to be performed during the period that the host system is idle. Although five background operations are depicted, it should be noted that any number of background operations can be available for selection. In addition, the approximate time of execution for each of the depicted operations are merely exemplary for illustration of the disclosure and are not meant to be limiting.

As illustrated, examples of background operations can include an L2P table update, an ECC scan, a block erase, read-modify-write, and a refresh operation. An L2P table update can include transferring data from an SRAM buffer to NAND memory and can be executed in less than 10 ms. An ECC scan can scan critical data blocks to determine if any blocks could fail due to ECC errors and can be executed in around 10 ms to 100 ms. A block erase operation can erase blocks that have been identified as discarded and that are to be brought into the wear leveling pool. A block erase operation can execute in between 100 ms and 1,000 ms. A read-modify-write operation can read a data block, make modifications to the data and then write the modified data to a new data block. A read-modify-write can be executed in between 1,000 ms and 10,000 ms. A refresh operation can refresh data blocks that have been identified as at risk to lose data (e.g., high bit error rate). A refresh operation can execute in between 10,000 ms and 100,000 ms.

The memory sub-system can select one or more background operations to execute during an idle period to optimize background work performed during the idle period. For example, the memory sub-system can select background operations that can be fully performed within the idle period. The memory sub-system can also account for which operation most needs to be executed. For example, if the idle time will be one second then each operation can be selected. However, if wear leveling is critical at that point in time (e.g., there is a large number of data blocks with larger erase counts than others) while a refresh is unnecessary (e.g., all data has been recently written). Therefore, wear leveling would be selected and executed rather than a refresh. In addition, more than one operation can be performed during the idle period. For example, with a 20 ms idle period, either two garbage collection operations, one garbage collection operation and two buffer transfers, or four buffer transfers could be performed, depending on which operation is most critical at the time the indication that the host system is to be idle is received.

Figure 6:
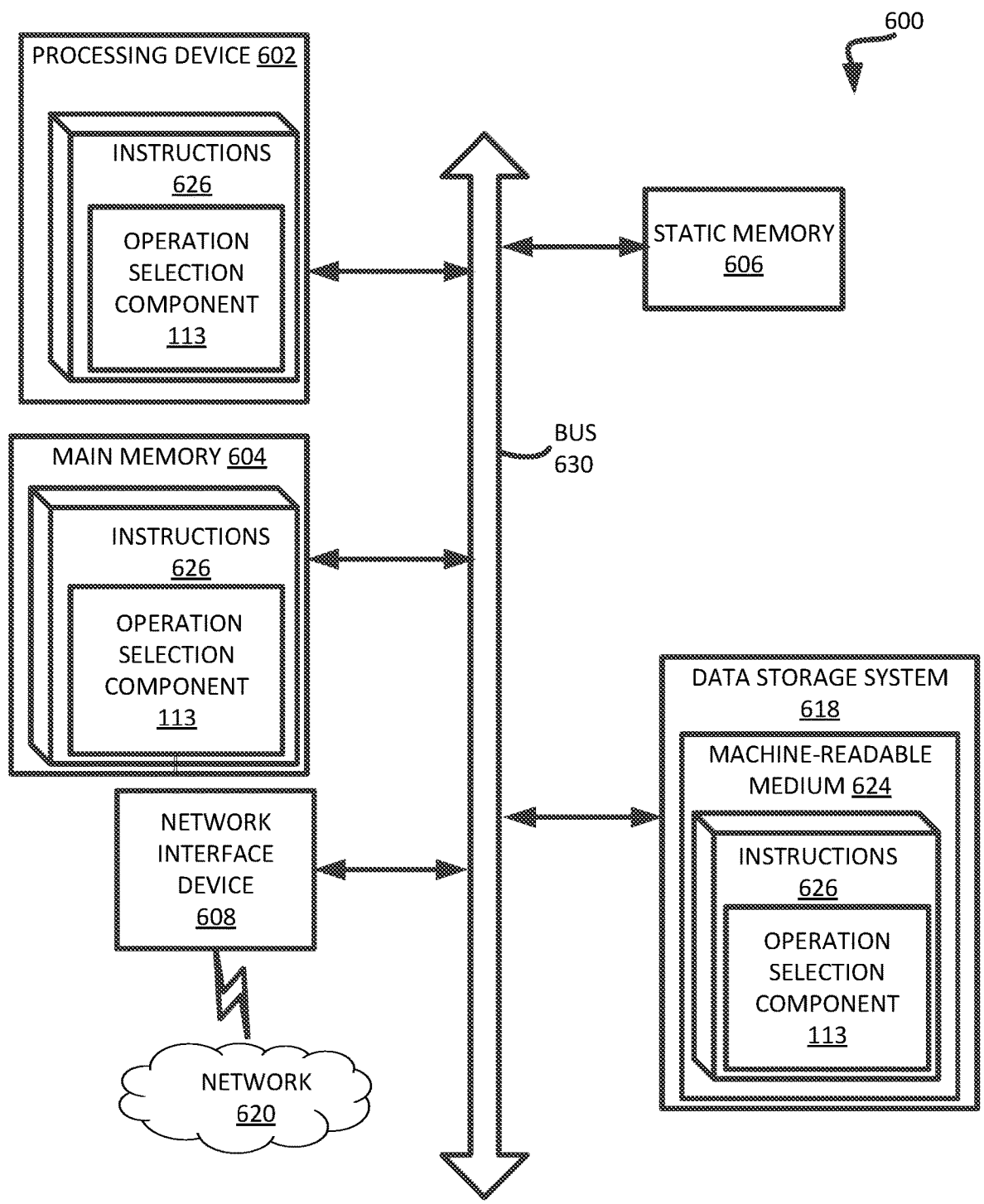
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the operation selection component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to an operation selection component (e.g., the operation selection component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
    receiving, by a processing device, an indication that a host system is to become idle for a first period of time;
    selecting, by the processing device, a background operation from a plurality of background operations based on the first period of time and a state of a memory sub-system indicative of resource usage of the memory sub-system, wherein the state of the memory sub-system comprises a number of buffer blocks available for receiving data from the host system; and
    causing, by the processing device, execution of the background operation at the memory sub-system during the first period of time.

2. The method of claim 1, further comprising:
    determining, by the processing device, the period of time that the host system is to become idle based on a previous usage of the host system, wherein the previous usage of the host system comprises previous idle periods and previous periods where data was received from the host system.

3. The method of claim 1, wherein the host system does not transmit any data to be stored at the memory sub-system during the first period of time.

4. The method of claim 1, wherein the host system transmits data to be stored at the memory sub-system at a lower bit rate during the first period of time than during a second period of time when the host system is not idle.

5. The method of claim 1, wherein the background operation is selected based on a time of execution for each background operation of the plurality of background operations.

6. The method of claim 1, wherein the background operation is selected to provide a threshold number of buffer blocks to store new data received from the host system when the host system is no longer idle.

7. The method of claim 1, wherein the state of the memory component further comprises total usage of memory, and fragmentation of data in the memory component.

8. A system comprising:
    a memory component;
    a processing device, operatively coupled to the memory component, the processing device to:
        determine that a host system is to become idle;
        determine that the host system is to be idle for a first period of time;
        identify a first background operation from a plurality of background operations to execute based on the first period of time and a state of a memory sub-system indicative of resource usage of the memory sub-system, wherein the state of the memory sub-system comprises a number of buffer blocks available for receiving data from the host system; and
        cause execution of the first background operation at the memory sub-system during the first period of time.

9. The system of claim 8, wherein, to determine that the host system is to become idle, the processing device is to:
    receive an indication from the host system that the host system will become idle, wherein the indication specifies a minimum amount of time that the host system will be idle.

10. The system of claim 8, wherein the processing device is further to:
    identify a second background operation from the plurality of background operations to execute based on the first period of time; and
    cause execution of the second background operation at the memory sub-system during the first period of time subsequent to executing the first background operation.

11. The system of claim 8, wherein the state of the memory component further comprises total usage of memory, and fragmentation of data in the memory component.

12. The system of claim 8, wherein the first background operation is further identified based on an execution time associated with each background operation of the plurality of background operations.

13. The system of claim 8, wherein the host system transmits data to be stored at the memory component at a lower bit rate during the first period of time than during a second period of time when the host system is not idle.

14. A non-transitory computer-readable storage medium comprising instructions that, when executed by a processing device, cause the processing device to:
    receive an indication that a host system is to become idle for a first period of time;
    determine a length of the first period of time based on at least one of: previous host system idle periods, a minimum length of time the host system is to be idle received in the indication, host system usage data, and resource utilization of a memory sub-system;

select a background operation from a plurality of background operations based on the length of the first period of time and a state of the memory sub-system indicative of resource usage of the memory sub-system, wherein the background operation is selected to increase background operation performance while the host system is idle, and wherein the state of the memory sub-system comprises a number of buffer blocks available for receiving data from the host system; and cause execution of the background operation at the memory sub-system during the first period of time, wherein the host system reduces an amount of data transmitted to the memory sub-system during the first period of time the host system is idle.

15. The non-transitory computer-readable storage medium of claim 14, wherein the processing device is further to:

determine the first period of time based on a previous usage of the host system, wherein the previous usage of the host system comprises a set of previous idle periods and a set of previous periods where data was received from the host system.

16. The non-transitory computer-readable storage medium of claim 14, wherein the host system does not transmit any data to be stored at the memory sub-system during the first period of time.

17. The non-transitory computer-readable storage medium of claim 14, wherein the host system transmits data to be stored at the memory sub-system at a lower bit rate during the first period of time than during a second period of time when the host system is not idle.

18. The non-transitory computer-readable storage medium of claim 14, wherein the background operation is selected based on a time of execution for each background operation of the plurality of background operations.

19. The non-transitory computer-readable storage medium of claim 14, wherein the background operation is selected to provide a threshold number of buffer blocks to store new data received from the host system when the host system is no longer idle.

20. The non-transitory computer-readable storage medium of claim 14, wherein the state of the memory component further comprises total usage of memory, and fragmentation of data in the memory component.

* * * * *